J. T. BERTHELOTE.
AUTOMATIC DOOR OPERATING AND CONTROLLING MEANS FOR GARAGES.
APPLICATION FILED MAY 22, 1917.
1,244,283.
Patented Oct. 23, 1917.
3 SHEETS—SHEET 1.
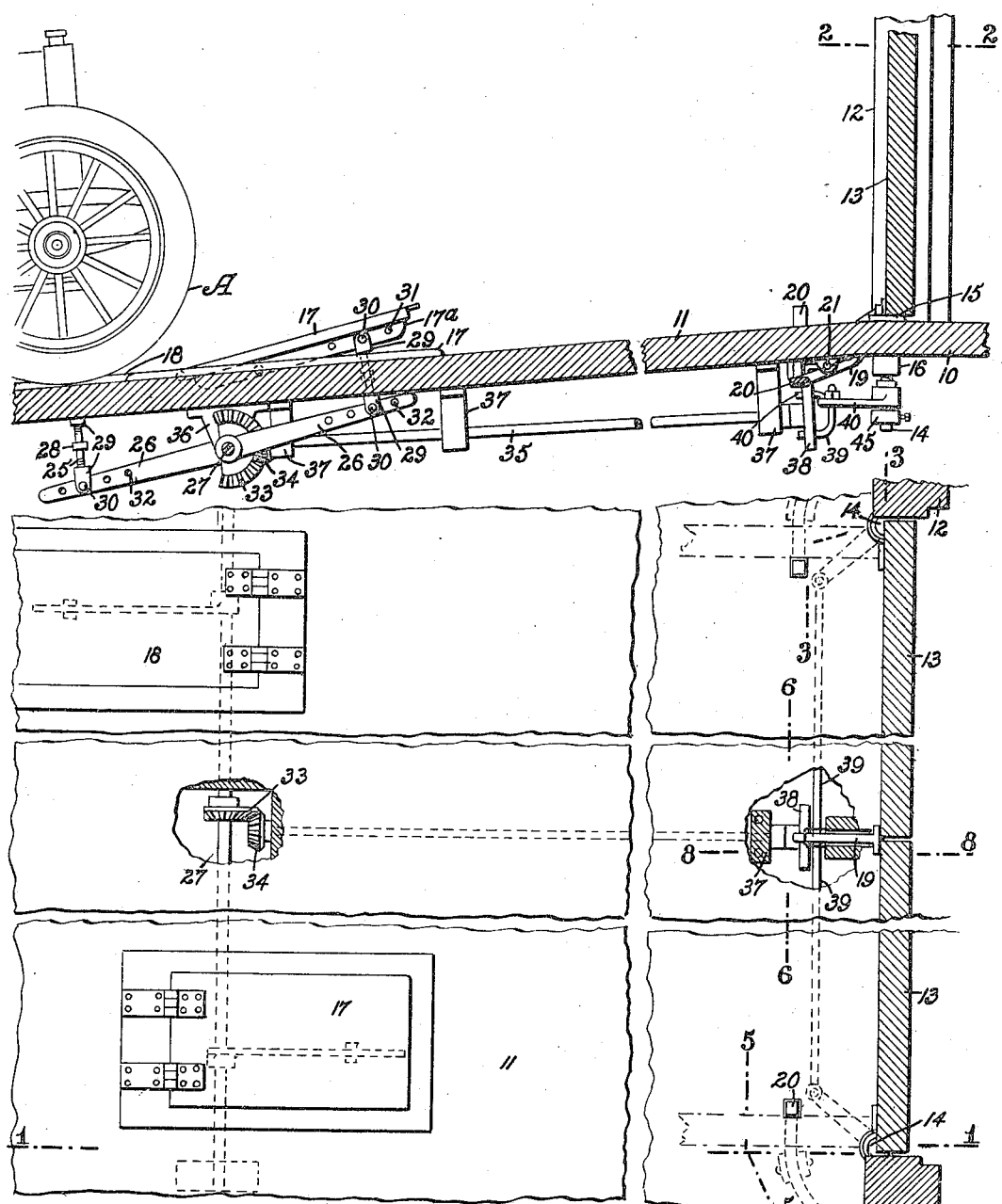
WITNESSES
H. T. Walker
J. L. McAuliffe
INVENTOR
J. T. Berthelote
BY
ATTORNEYS

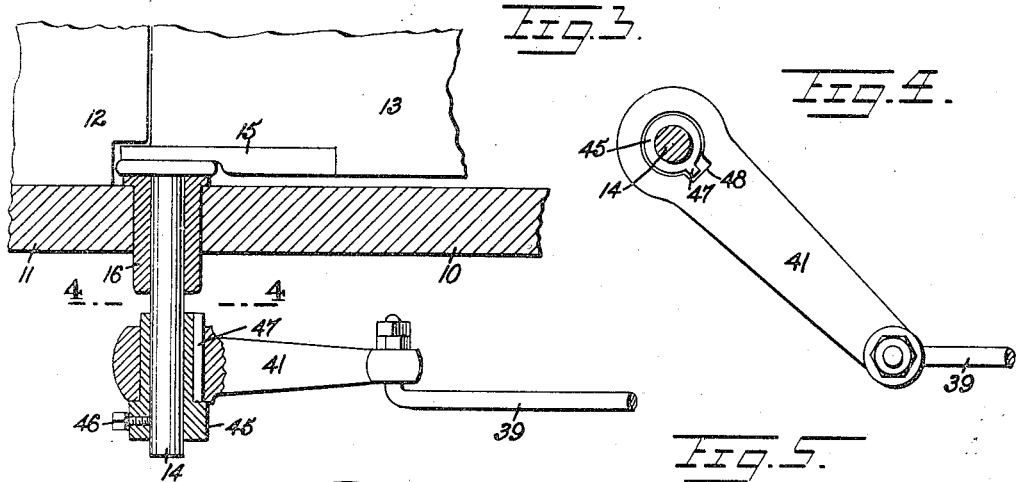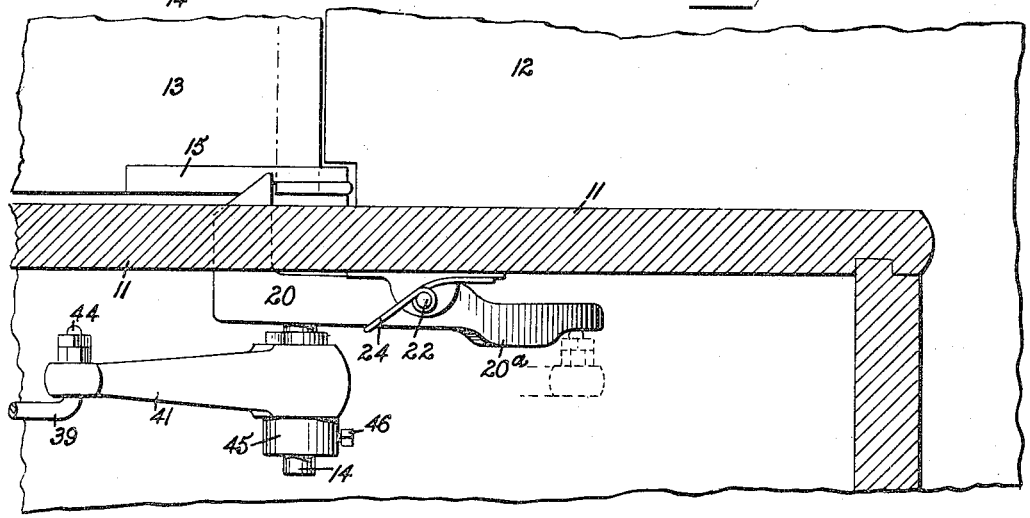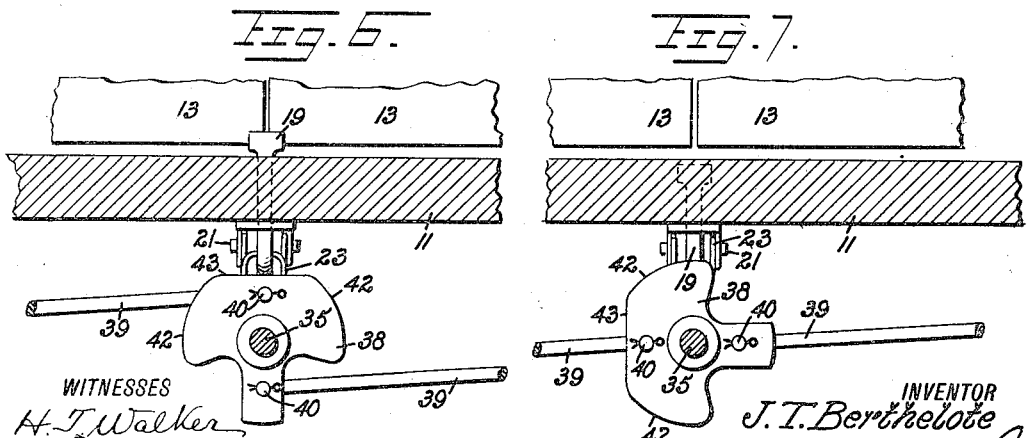

J. T. BERTHELOTE.
AUTOMATIC DOOR OPERATING AND CONTROLLING MEANS FOR GARAGES.
APPLICATION FILED MAY 22, 1917.
1,244,283.
Patented Oct. 23, 1917.
3 SHEETS—SHEET 3.
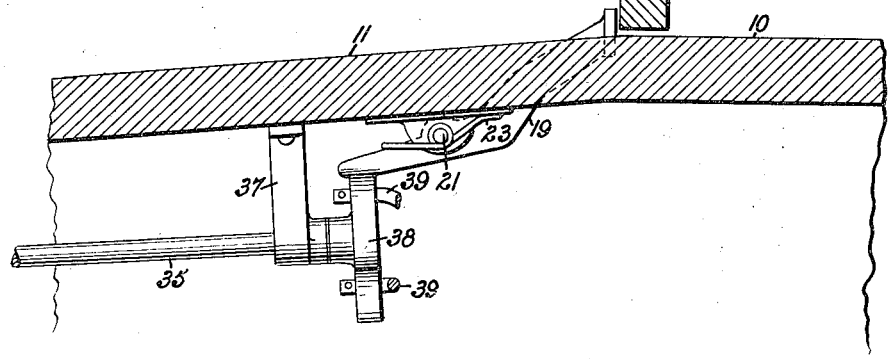
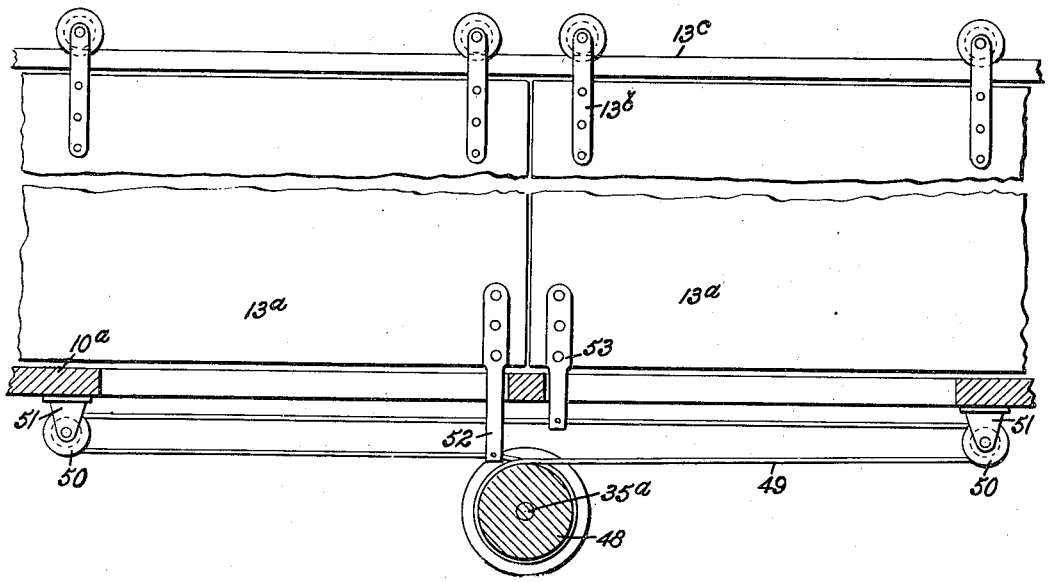
WITNESSES
INVENTOR
J. T. Berthelote
BY
ATTORNEYS

UNITED STATES PATENT OFFICE.

JOSEPH THOMAS BERTHELOTE, OF HAVRE, MONTANA.

AUTOMATIC DOOR OPERATING AND CONTROLLING MEANS FOR GARAGES.

1,244,283. Specification of Letters Patent. Patented Oct. 23, 1917.

Application filed May 22, 1917. Serial No. 170,191.

*To all whom it may concern:*

Be it known that I, JOSEPH T. BERTHELOTE, a citizen of the United States, and a resident of Havre, in the county of Hill and State of Montana, have invented a new and Improved Automatic Door Operating and Controlling Means for Garages, of which the following is a full, clear, and exact description.

My invention relates to means for opening or closing doors and for latching the same in the closed or open position, the invention being adapted to be associated with a garage or the like whereby the door operating means will be automatically actuated by the wheels of a vehicle in approaching the doors or departing therefrom.

Objects of the invention are to provide door operating and controlling means wherein the operation of the latches will be properly timed with the door actuating means, and to provide a simple construction and arrangement of the parts insuring strength and durability and permitting of the adjustment thereof with facility and despatch to insure the automatic operation with precision.

The nature of the invention and the advantages thereof will clearly appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a longitudinal vertical section of my improved door operating and controlling means showing the same in connection with portions of a garage, its doors, and the ramp or approach arranged at the doorway, the section being taken on the line 1—1, Fig. 2;

Fig. 2 is a sectional plan view, parts being broken away, the section being indicated by the line 2—2, Fig. 1;

Fig. 3 is a detail vertical section given to show the manner of hinging the door and the actuating means to turn the hinge pin;

Fig. 4 is a sectional plan view on the line 4—4, Fig. 3;

Fig. 5 is an enlarged transverse vertical section on the line 5—5, Fig. 2;

Fig. 6 is a transverse, vertical section on an enlarged scale on the line 6—6, Fig. 2;

Fig. 7 is a view similar to Fig. 6 but showing the latch operating cam in a different position;

Fig. 8 is a fragmentary, longitudinal, vertical section on the line 8—8, Fig. 2;

Fig. 9 is a transverse, vertical section with parts broken away, showing means to adapt the invention to sliding doors.

Referring particularly to the embodiment of the invention illustrated in Figs. 1 to 8, the numeral 10 indicates the floor of a garage or the like; 11 an approach leading thereto, here shown as in the form of a ramp; 12 indicates the garage walls; and 13, hinge doors, the invention as illustrated being arranged in connection with a pair of doors.

Each door 13 is hinged at the bottom through the medium of a vertical hinge pin 14 it being understood that the upper portion of the door will be hinged in any suitable manner to accord with the position of the pin 14. The hinge pin 14 is fastened rigidly to the door by any suitable securing head 15 and turns in a bushing 16 in the floor 10. In the ramp 11 depressible hinge sections 17, 18 are provided to be actuated by a vehicle approaching or leaving the doors 13, the said sections being oppositely disposed and arranged to move reversely so that as one section 17 or 18 is depressed, the other will be raised and vice versa. The depression of a hinge section 17 or 18 constitutes a prime mover to open or close the doors and to control a latch or door stop 19 for holding the doors closed as well as latches 20 for holding the doors open. The latch 19 is pivoted between the ends thereof for vertical rocking movement as at 21 at the underside of the ramp 11 and similarly the latches 20 are pivoted as at 22 beneath the ramp to rock vertically. A suitable spring 23 normally tends to hold the latch 19 in the locking position and a spring 24 tends to maintain the latch 20 in the locking position.

Each depressible section or equivalent element 17, 18, is connected by a connecting rod 25 with an arm 26 on a transverse shaft 27 beneath the ramp 11. The rod 25 at the central portion is in the form of a turnbuckle 28 having right and left threaded connections with the forked ends 29 of said rod to adjust the length thereof, the one forked end 29 being secured by a pin 30 to a rib or flange 17ᵃ rigid on the sections 17, 18 at the under side, said rib having longitudinal series of pin holes 31, either of which is adapted to receive said pin. Similarly, the lower forked end 29 is secured by a pin 30 to the arm 26, there being a longitudinal series of pin holes 32 therein. The connecting rod adjustable as to length and the provision of the pin holes 31, 32 will serve to regulate the stroke of the arms 26 to variously apply to the shaft 27 the force exerted by the vehicle on the hinge section and also within certain limits to vary the angle through which the arms 26 are moved. On the transverse shaft 27 a toothed sector 33 is secured and meshes with a pinion 34 on a longitudinal shaft 35. The shaft 27 is shown as turning in suitable hanger bearings 36, on the under side of the ramp 11, there being hanger bearings 37 for the shaft 35.

It will be obvious that a depression of the respective elements 17, 18 will impart reverse movements to the shaft 35 through the shaft 27. The turning of the shaft 35 serves to turn the hinge pins 14 and to control the latches 19, 20 for which purpose in the form illustrated in Figs. 1 to 8 the following devices are made use of. On that end of the shaft 35 adjacent to the doors 13, a cam 38 is secured which is adapted to control the latch 19 by direct engagement therewith and from said cam at opposite sides of the shaft 35, extend connecting rods 39, suitably secured as at 40 to the cam and extending in opposite directions laterally outward to a connection with arms 41 on the hinge pintles 14. The cam 38 is formed with curved side surfaces 42 and with an intermediate upper, approximately straight surface 43 joining said side surfaces. The spring 23 of the latch 19 maintains the said latch at one side of its pivot in contact with the cam, and tends to maintain the other arm of the latch projecting above the ramp 11 to lie in front of the doors 13 to prevent opening of the same, and it will be seen that a turning of the shaft 35 in either direction will cause the latch to ride on the curved surfaces 42 whereby to tilt the latch in a way to withdraw the same from the position illustrated in Figs. 6 and 8 in front of the doors 13 to a depressed position above the path of the doors as in Fig. 7. On the other hand when the cam is positioned to present its intermediate surface 43, to the latch arm, the spring 23 is permitted to tilt the latch to the locking position in front of the doors.

The latch 20, for holding a swinging door 13 in the open position, as will be observed from Fig. 2, is curved and lies in the path of the upturned outer end 44 of the rod 39, so that the latch will be thereby tripped, for which purpose the latch 20 on one arm thereof is formed at the under side with a cam 20ª to be engaged by the end 44 of the rod 39. The arrangement is such that in the turning of the shaft 35 the first action will be to release the latch 19 to permit a door to swing. The continued turning of the element 38 will then actuate the rod 39 whereby to swing the door through the medium of the arm 41 and hinge pin 14, the continued movement of the rod 39 serving to trip the latch 20, thereby withdrawing the latch 20 from the path of movement of the swinging door, the rod 39 in its final movement causing the end 44 thereof to pass from the cam 20ª as indicated in dotted lines in Fig. 5, thereby permitting the spring 24 to throw the latch 20 into position to engage the door after the latter has reached the limit of its opening movement.

In order that the action of the arm 41 in swinging the door may be properly timed with the release of the latch 19, a lost motion is provided for between the said arm 41 and the hinge pin 14 for which purpose a collar 45 is suitably secured to the hinge pin as by a set screw 46, and said collar has a reduced portion on which the arm 41 is received, the reduced portion of the collar having a key or rib 47 which is received in a slot 48 wider than said rib, the result being that the arm 41 will swing through a small angle relatively to the pin 44 and then turn said pin through the medium of the collar 45 and rib 47 after the latch 19 has been actuated. The movement of one depressible element as 17 having resulted in opening and latching the door, the rocking of the shaft 27 will have raised the other depressible element 18 so that the depression of the latter element by a vehicle leaving a garage will again actuate the latches and the door in the reverse order from that occasioned by the depression of the element 17.

In Fig. 9 sliding doors 13ª are indicated, supported on hangers 13ᵇ or the like running on a track 13ᶜ in a known manner. To actuate the doors by the turning of the shaft 35ª corresponding with the shaft 35, a drum 48 is secured to the shaft in lieu of the cam 38 and an endless belt or cable 49 is given a turn about said drum and run over pulleys 50 on fixed brackets 51 so that the turning of the shaft 35ª in opposite directions, will give corresponding movements to the belt 49. Connection is established between the respective doors 13ª and the respective upper and lower runs 39 through the medium of straps, there being a strap 52 connecting one run of the belt with one door and a strap 53 connecting the other run of the belt with the other door.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. The combination with a swinging door and a hinge pintle thereon, of a depressible prime mover adapted to be actuated by a vehicle wheel, a latch positioned to hold the door closed, a latch positioned to hold the door open, an operating arm mounted on the hinge pintle to turn the same and thereby swing the door, the said arm being capable of independent turning movement on the pintle through a limited angle and capable of a further movement to turn the pintle, and means to control said latches and operate the said arm on the pintle, in sequence, by the depression of said prime mover.

2. The combination with a swinging door and a hinge pintle thereon, of a depressible prime mover adapted to be actuated by a vehicle wheel, a latch pivoted between its ends to rock vertically and positioned to hold the door closed, a revoluble member operative by the depression of said prime mover, and adapted to control said latch, connections between said revoluble member and the hinge pintle to turn the latter, and a latch positioned adjacent to the hinge pintle and adapted to hold the door open, said last-mentioned latch being pivoted for vertical rocking movement and having a portion disposed in the path of movement of the pintle actuating means.

3. The combination with a swinging door and a hinge pintle thereon, of a depressible prime mover adapted to be actuated by a vehicle wheel, a revoluble member arranged to be actuated by the depression of said prime mover, a latch positioned to hold the door closed and controlled by said revoluble member, an arm on said pintle to turn the same and arranged to time the turning of the pintle with the movements of the said latch, a rod connected with said arm and with said revoluble member, and a latch positioned to hold the door open and having a curved portion disposed in the path of movement of the said rod to be actuated by the latter in proper sequence with the turning of the hinge pintle by the said arm.

4. The combination with a swinging door and a hinge pintle thereon, of a depressible prime mover adapted to be actuated by a vehicle wheel, a revoluble member arranged to be actuated by the depression of the said prime mover, and formed with a cam, a latch adapted to hold the door closed, said latch being in engagement with the cam to be actuated thereby, an arm on the hinge pintle, said arm being capable of a limited movement relatively to the pintle and capable of a further movement to turn the pintle whereby to time the swinging of the door with the movements of the latch, and a rod connected at one end with the said arm and at the opposite end with the said revoluble member.

5. The combination with a swinging door and a hinge pintle thereon, of a depressible prime mover adapted to be actuated by a vehicle wheel, a revoluble member arranged to be actuated in opposite directions by the depression of said prime mover, a collar on the pintle and formed with a lateral rib thereon, an arm loose on said collar and formed with a recess permitting limited movement of the arm relatively to the said rib, a rod connecting said arm with the said revoluble member, and a latch positioned to hold the door closed, said revoluble member having cam surfaces to actuate said latch by the turning of said member in advance of the turning of the pintle.

6. The combination with a door, of door operating means, a rock shaft, means to actuate the door operating means by said shaft, an arm on the shaft to rock the same, a depressible element adapted to be actuated by a vehicle wheel, and means to variably connect the said depressible element and arm, said last-mentioned means including a longitudinal series of pin holes in the depressible element and in the arm, and pins engaging the opposite ends of said connecting rod and adapted to be engaged in any of the holes of either series.

JOSEPH THOMAS BERTHELOTE.